July 21, 1970   R. F. CHAMBERS   3,520,981
APPARATUS FOR CLASSROOM PHYSICS EXPERIMENTS
Filed June 7, 1968

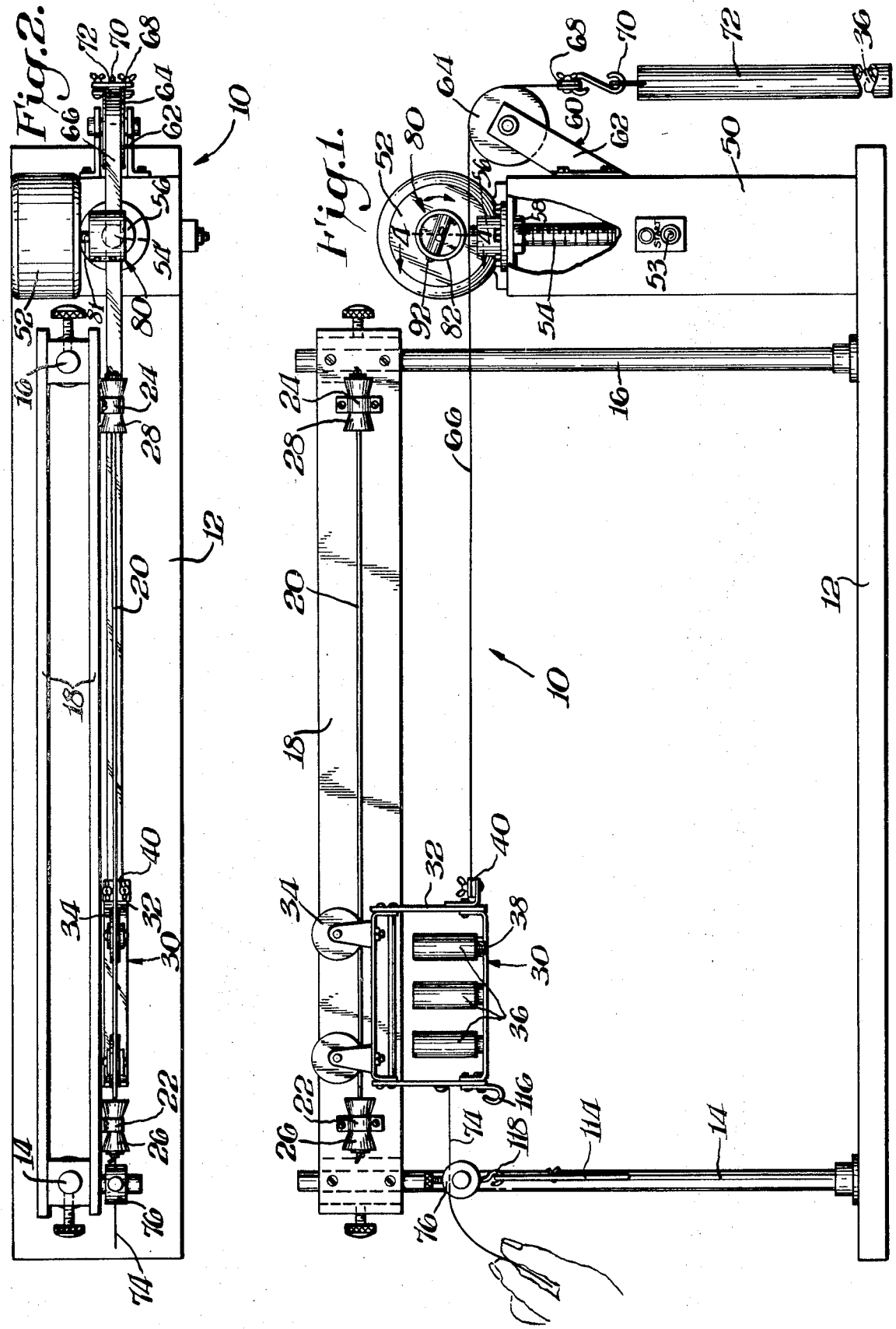

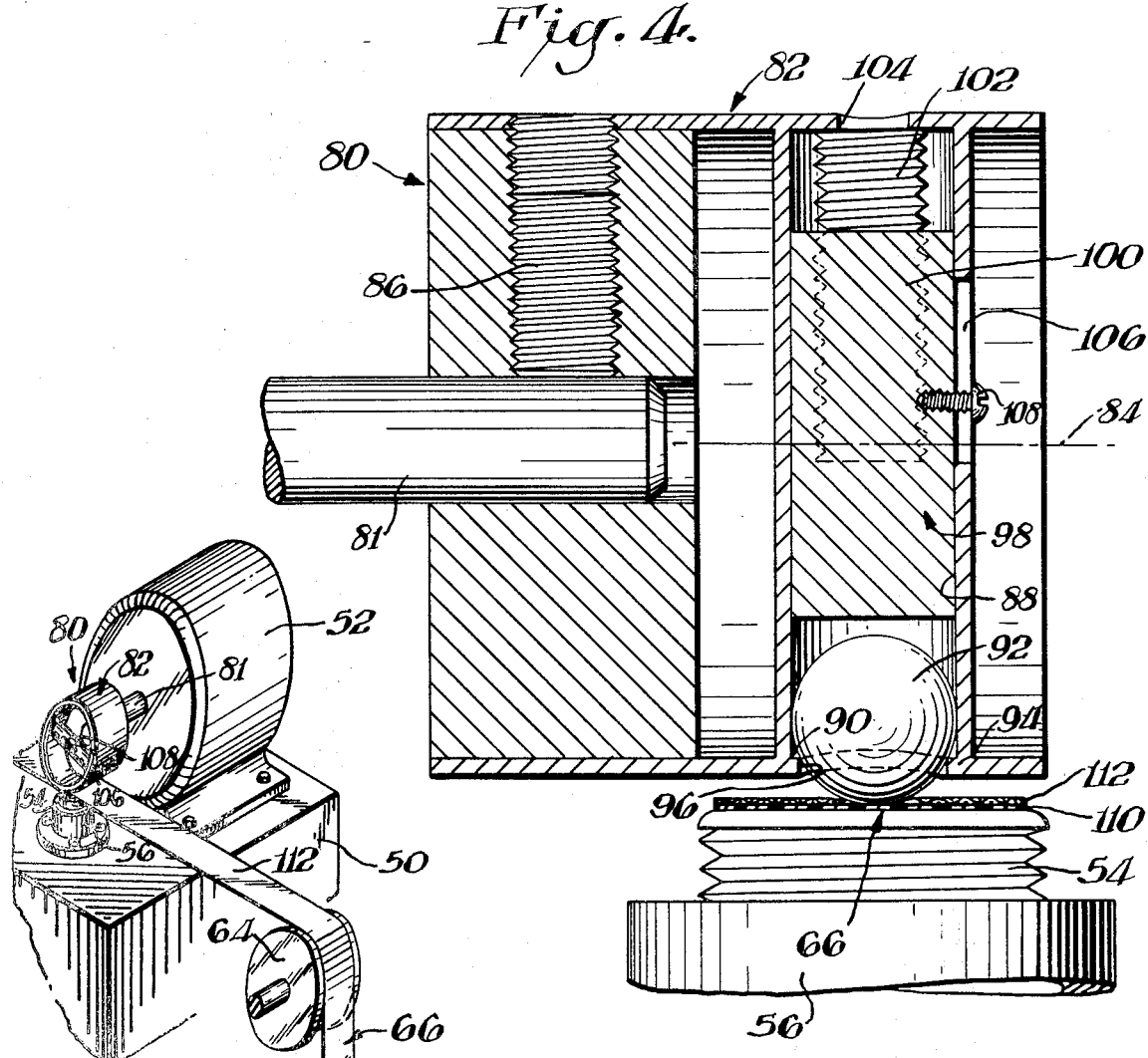
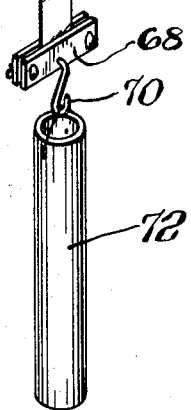
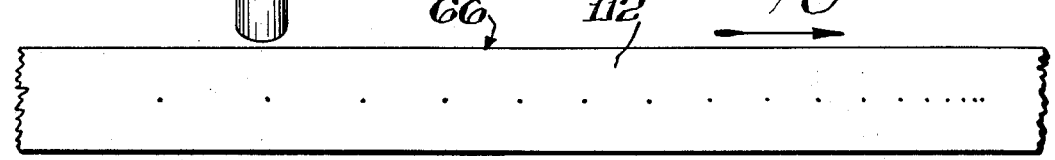

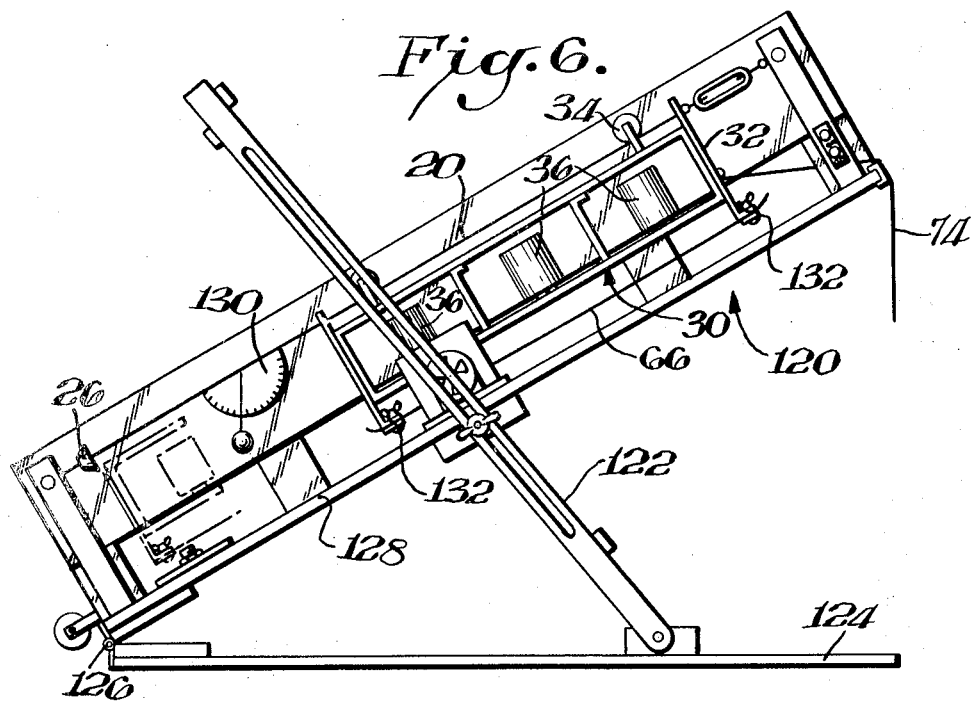
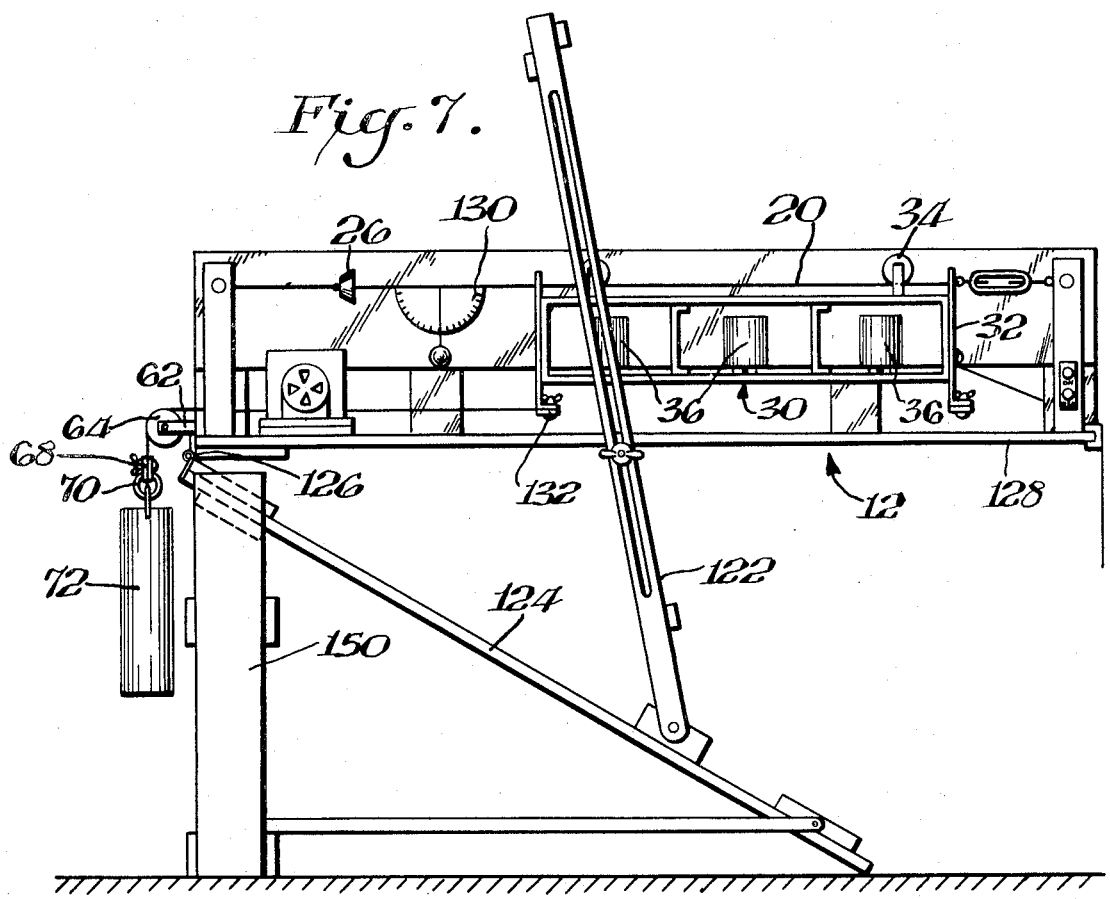

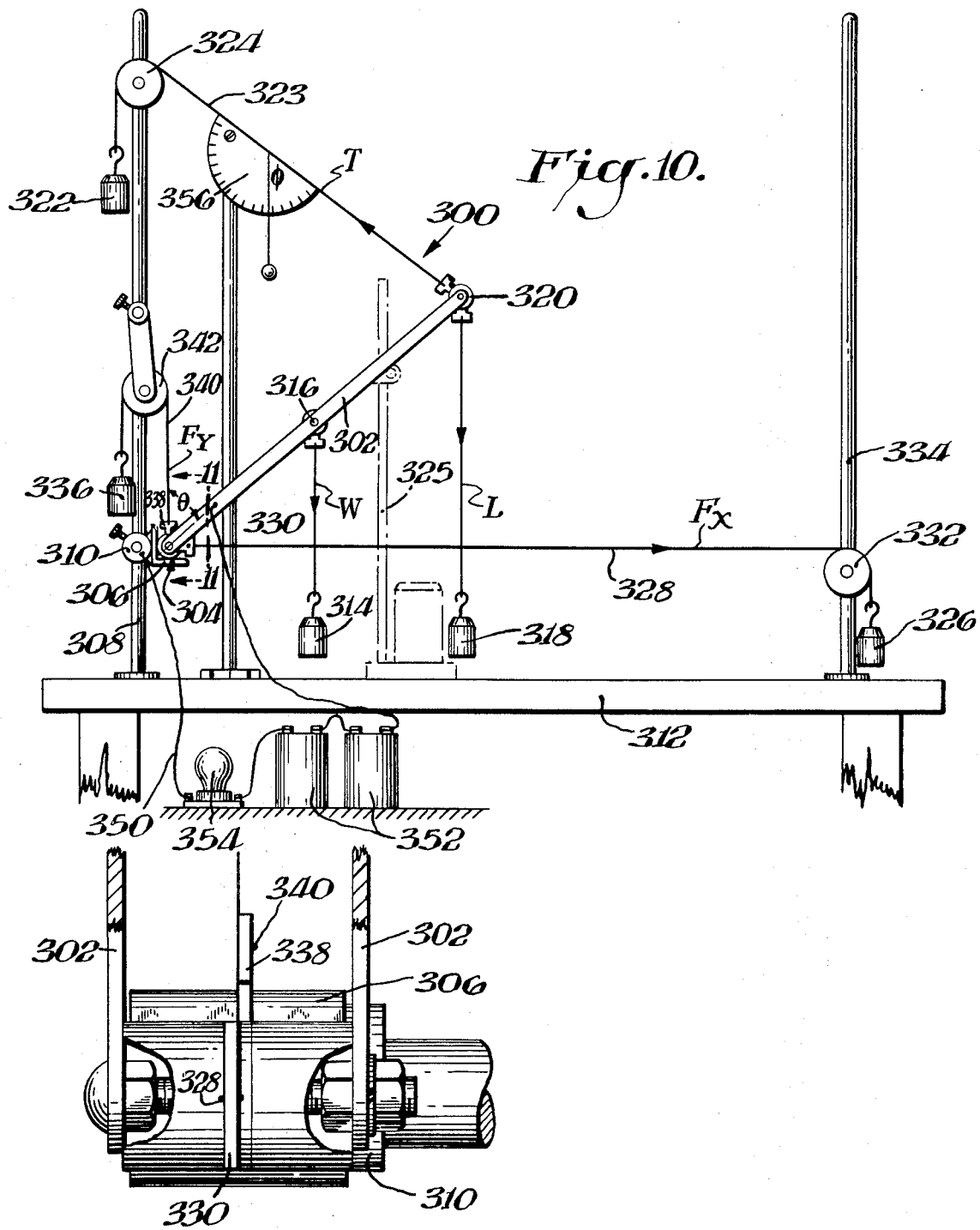

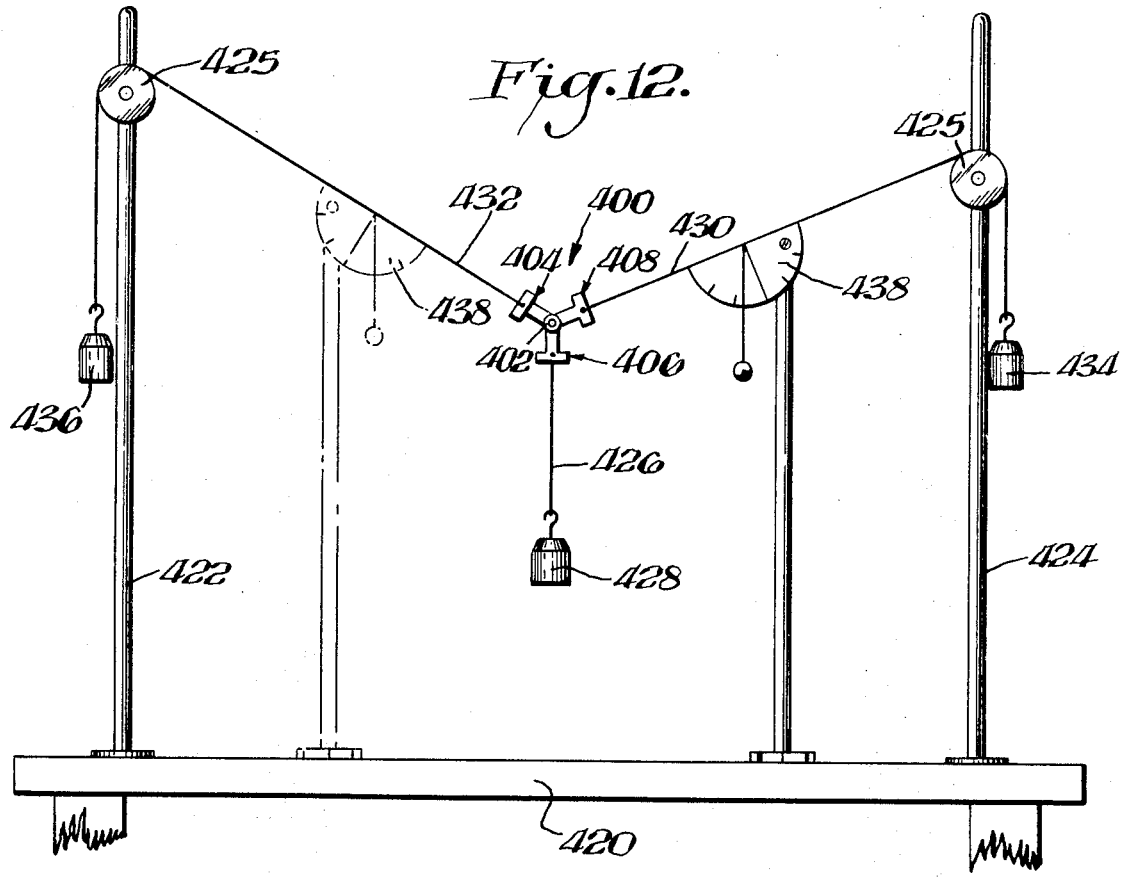
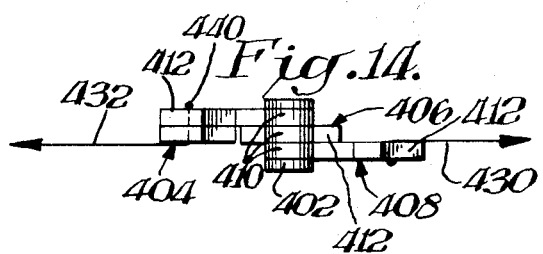
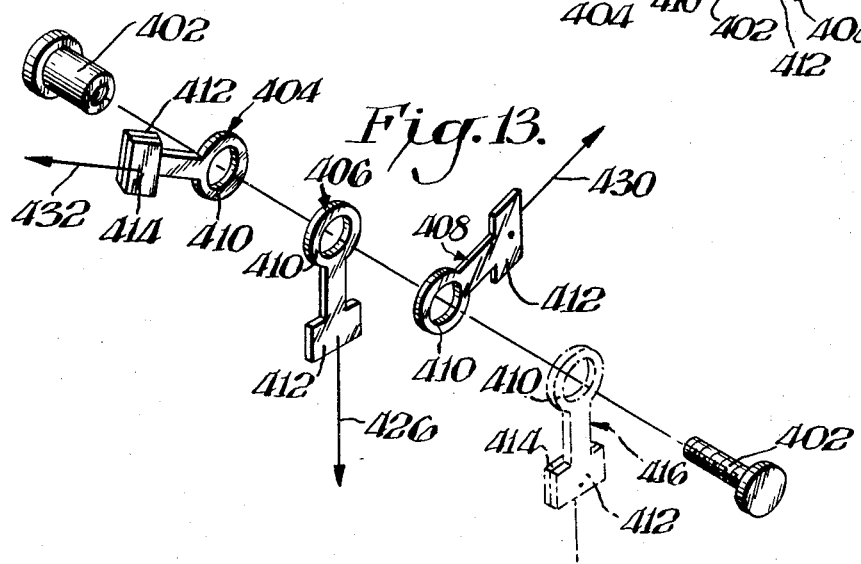

United States Patent Office 3,520,981
Patented July 21, 1970

3,520,981
APPARATUS FOR CLASSROOM PHYSICS
EXPERIMENTS
Robert F. Chambers, 504 Beverly Road,
Newark, Del. 19711
Filed June 7, 1968, Ser. No. 735,259
Int. Cl. G09b 23/06; G01d 15/02
U.S. Cl. 35—19                                        6 Claims

ABSTRACT OF THE DISCLOSURE

Marker for recording displacement of moving object at regular intervals of time comprises housing having longitudinal axis about which housing rotates when connected to source of constant rotary power. Passageway in housing extends inwardly from open end at housing exterior toward longitudinal axis of housing. Mass moves within passageway and stops limit movement of mass between marking position in which mass extends beyond housing exterior and non-marking positions in which mass is spaced inwardly from marking position. Movable mass strikes post slightly spaced from housing exterior once for each revolution of housing to mark tape drawn between housing and post upon each impact of mass against post.

Other apparatus determines weight components of mass on inclined plane which components act perpendicular and parallel to incline of plane.

Experimental derrick comprises apparatus for determining horizontal and vertical components of reaction force hinge pin assembly of derrick exerts on derrick boom.

BACKGROUND OF THE INVENTION

The present invention relates to apparatus for classroom physics experiments, and more particularly to apparatus for demonstrating motion and equilibrium phenomena.

Prior to the present invention, numerous structural arrangements have been proposed for the purpose of demonstrating phenomena associated with the classroom instruction of physics. For the most part, these arrangements are characterized by their complex mode of operation as well as the expense of their overall construction. Financially, most of these arrangements are beyond the reach of many school systems. Moreover, the complex nature of most of these arrangements results in the lack of interest on the part of the students. Often, students lose interest during the particular demonstrations because of the lengthy procedures necessary to achieve a desired result or prove a particular law. Thus, the teaching profession has long sought equipment for physics experiments which is reliable, inexpensive and simple to use.

Accordingly, it is an object of the present invention to avoid the above disadvantages and provide apparatus for classroom physics experiments which is simple to operate and maintain, inexpensive and reliable.

SUMMARY OF THE INVENTION

In accordance with the present invention, a marker is provided for recording the displacement of a moving object at regular intervals of time. The displacement marker comprises a housing having a longitudinal axis about which the housing rotates when the marker is connected to a source of constant rotary power. A passageway in the housing extends inwardly from an open end at the housing exterior toward the longitudinal axis. A movable mass is positioned within the passageway. Stops limit movement of the mass between a marking position in which the mass extends beyond the exterior surface of the housing and non-marking positions in which the mass is spaced inwardly from its marking position.

The movable mass may be spherical in shape and the passageway radially disposed relative to the longitudinal axis of the housing. Moreover, the stops may include a fixed stop at the exterior of the housing with an adjustable stop spaced inwardly from the fixed stop. The fixed stop may include a circular opening of smaller diameter than the diameter of the spherical mass.

The displacement marker of the present invention is utilized in combination with a source of constant rotary power connected to rotate the housing about its longitudinal axis. A post slightly spaced from the exterior of the housing is positioned so that the movable mass strikes the post once for each revolution of the housing. A tape is provided as well as an arrangement for drawing the tape between the housing and the post. The tape is marked upon each impact of the movable mass against the post.

Apparatus is also provided for determining the weight components of a mass on an inclined plane which components act perpendicular and parallel to the incline of the plane. Such apparatus comprises an adjustable inclined plane with a mass supported on the plane. An arrangement associated with the plane is provided for applying force to the mass in an upward direction perpendicular to the inclined plane until the mass moves away from the plane. Additionally, a similar arrangement applies force to the mass in an upward direction parallel to the inclined plane until the mass moves in the direction of that force.

The mass may have front and rear wheels and an overall construction of electrically conductive material. Moreover, the inclined plane may include an electrically conductive strip upon which the wheels of the mass rest. An electrically conductive stop on the strip maintains the mass in static equilibrium on the incline. A series electrical circuit interconnects the mass, stop, and strip. The circuit includes an arrangement for indicating a break therein when the mass is out of contact with the stop and strip. When the break in the circuit occurs the horizontal and perpendicular forces applied to the mass are compared with the theoretical values of the weight components.

The experimental derrick apparatus of the present invention comprises a weighted boom with a hinge pin assembly at the lower end thereof and support structure for the hinge pin assembly. A load is attached to the upper end of the boom and weights acting in an upward direction maintain the boom in equilibrium. The derrick apparatus includes an arrangement for determining the horizontal and vertical components of the reaction force the hinge pin assembly exerts on the boom. This arrangement applies a horizontal force sufficient to slightly shift the hinge pin assembly horizontally away from the support structure and a vertical force sufficient to slightly shift the hinge pin assembly vertically away from the support structure. When the boom is out of contact with the support structure the horizontal and vertical forces are compared with the theoretical values for these forces.

The experimental derrick may also include a series electrical circuit interconnecting the hinge pin assembly and the support structure. The circuit includes an arrangement for indicating a break therein when the hinge pin assembly is out of contact with the support structure.

Dependable equilibrium experiments are easily conducted with the eyelet and lug assembly of the present invention. The eyelet is in the form of a shaft with a series of lugs mounted thereon. Each lug includes a looped portion of the same thickness that loosely surrounds the shaft, and a coplanar end portion of the same thickness as a looped portion. The looped portions of the lugs contact one another in a line on the shaft. At least one of the end lugs in the line includes an additional portion connected and equal in thickness to its coplanar end portion with the additional portion offset in the direction of the adjacent lug in the line. This assembly enables the application of coplanar forces to the eyelet.

In the case of four lugs mounted on the eyelet, the two end lugs each have an additional portion connected and equal in thickness to its coplanar end portion with the additional portion of each end lug offset in the direction of the inside lug adjacent to it.

Brief description of the drawing

Novel features and advantages of the present invention in addition to those mentioned above will become apparent to one skilled in the art from a reading of the following detailed description in conjunction with the accompanying drawing wherein similar reference characters refer to similar parts and in which:

FIG. 1 is a side elevational view of an apparatus according to the present invention;

FIG. 2 is a top plan view of the apparatus shown in FIG. 1;

FIG. 3 is a perspective view of a portion of the apparatus shown in FIGS. 1 and 2 illustrating the displacement marker according to the present invention;

FIG. 4 is a longitudinal sectional view taken along line 4—4 of FIG. 1 illustrating the movable mass of the displacement marker at impact;

FIG. 5 is a top plan view of a tape with displacement markings thereon;

FIG. 6 is a side elevational view of another apparatus according to the present invention;

FIG. 7 is a side elevational view of the apparatus shown in FIG. 6 supported in a horizontal position;

FIG. 10 is a front elevational view of another apparatus according to the present invention;

FIG. 11 is a sectional view taken along line 11—11 of FIG. 10;

FIG. 12 is a front elevational view of still another apparatus according to the present invention;

FIG. 13 is an exploded view of the eyelet and lug assembly according to the present invention; and FIG. 14 is a top plan view of the eyelet and lug assembly of the apparatus shown in FIG. 12.

Detailed description of the invention

Figure 8:
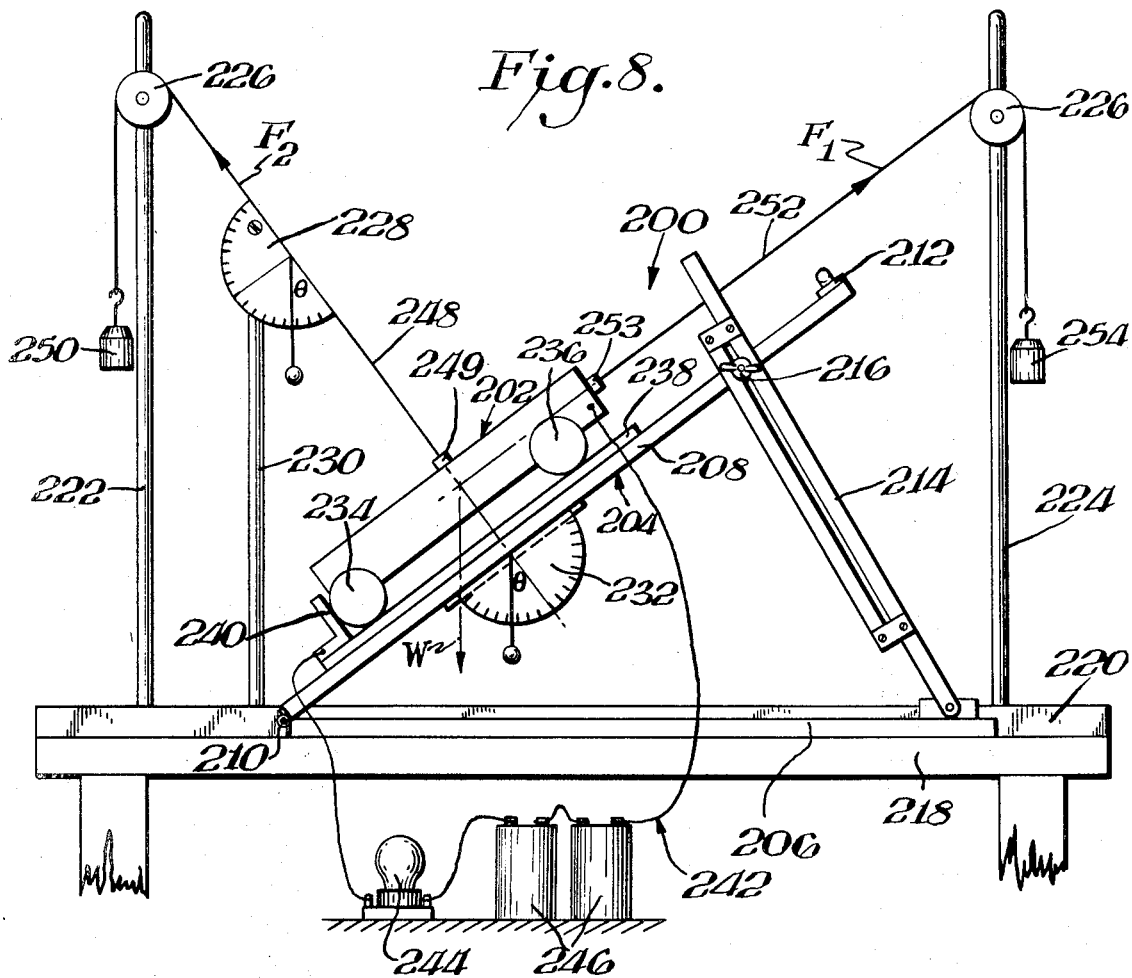
FIG. 8 is a front elevational view of still another apparatus according to the present invention.

Referring in more particularity to the drawing, FIGS. 1 and 2 illustrate an acceleration apparatus 10 according to the present invention. The apparatus comprises a support surface 12 with a pair of spaced apart standards 14, 16 connected thereto. A horizontal member 18 is adjustably fixed between the standards at their upper ends. The horizontal member carries a guide wire 20 anchored thereto by a pair of brackets 22, 24. Rubber stoppers 26, 28 surround the guide wire at its ends and are fixed to the support member 18 by the brackets 22, 24. A carriage 30 mounted on the guide wire 20 comprises a frame 32 with a pair of rollers 34 connected thereto that ride on the guide wire. Three equal weights 36 are releasably connected to the frame 32 by threaded connectors 38. The frame also carries a clamp 40, for purposes explained more fully below. The mass of the frame 32 together with the clamp 40 and the rollers 34 is approximately equal to twice the mass of one of the three equal weights 36. Thus, the combined mass of the carriage 30 is five times that of one of the masses 36.

A stand 50 is provided at one end of the support surface 12. A motor 52 is mounted at the top of the stand and a starter button 53 on the stand is utilized to energize the motor. Additionally, the stand 50 carries an externally threaded post 54 adjustably connected at the upper end thereof by an internally threaded boss 56 anchored to the stand. The elevation of the post 54 is easily adjusted by turning it within the boss 56. When the desired elevation is obtained, for reasons discussed below, the post is locked in place by an internally threaded fastener 58. A bracket 60 anchored to the side of the stand 50, as shown in FIG. 1, comprises a pair of arms 62 with a pulley journaled between the arms.

A markable tape 66 is connected to the clamp 40 on the carriage 30. The tape extends from that clamp over the upper surface of the post 54 to the pulley 64. The tape extends downwardly from the pulley and its free end portion is secured to a clamp 68 that carries a hook type fastener 70. A hollow metal cylinder 72 closed at its lower end is connected to the fastener 70 and this cylinder has a mass approximately equal to twice that of one of the masses 36, for reasons discussed below.

The carriage is maintained in the position shown in FIG. 1 by a flexible strand 74 connected to the frame 32 of the carriage. The strand may be wrapped around a horizontal support 76 connected to the standard 14 at all times prior to use of the acceleration apparatus. However, just before conducting the experiment, the flexible strand is manually held and then released. As can readily be understood, the carriage rides along the guide wire 20 being driven in that direction by the force of gravity acting on the cylinder 72. Such motion causes the tape 66 to travel across the upper end of the post 54. As the tape so travels it is periodically marked by a displacement marker 80 connected to the shaft 81 of the motor 52.

The displacement marker 80 according to the present invention comprises a housing 82 having a longitudinal axis of rotation 84. The housing is connected to the shaft 81 of motor 52 by a threaded set screw 86 which is driven against the shaft, as shown in FIG. 4. With the set screw 86 tightly against the motor shaft the housing of the marker rotates with the motor when it is energized. A passageway 88, preferably radially disposed with regard to the axis of rotation 84, is provided in the housing 82. The passageway extends inwardly from an open end 90 at the exterior of the housing in a direction toward the longitudinal axis of rotation 84. A spherical metal mass 92 is disposed within the passageway 88. Movement of the mass is limited by a fixed stop 94 at the exterior surface of the housing. The stop 94 has a circular opening 96 of smaller diameter than the diameter of the spherical mass but large enough to enable the mass to project beyond the exterior of the housing.

Inward travel of the spherical mass 92 is limited by an adjustable stop 98 comprising a metal plug 100 slidably disposed within the passageway 88. Adjustment of the stop 98 is achieved by a set screw 102 threaded into the interior of the plug 100. The set screw is accessible through an opening 104 in the exterior of the housing 82. Movement of the set screw in one direction draws the plug 100 away from the spherical mass 92 while movement in the opposite direction operates to move the plug closer to the spherical mass. A slotted opening 106 is provided in the side wall of the passageway 88 and a threaded fastener 108 extends from outside the passageway through the slotted opening into the plug 100. The head of the threaded fastener 108 is larger than the slot so that tightening of that fastener anchors it against the side wall structure of the passageway. Together, the threaded fastener 108 and the set screw 102 enable accurate adjustment of the stop 98.

The displacement marker 80 functions on a centrifugal principle. The spherical mass 92 in seeking a circle of larger radius than that of the housing 82 attempts to escape through the opening 96. In so doing, the spherical mass 92 assumes a fixed reproducible marking position at that opening and exerts a centrifugal force against the exterior surface of the housing 82. The post 54 is directly under the spherical mass 92 and is adjusted in elevation to a position where the spherical mass strikes the post once for each revolution of the housing 82. The impulse the post gives the spherical mass at impact drives the mass into the passageway 88 against the adjustable stop 98 to its non-marking positions. Upon rebounding from the adjustable stop 98, the spherical mass once again assumes the fixed, reproducible marking position against the fixed stop 94. Thus, for each revolution of the housing the spherical mass strikes the post 54, rebounds therefrom, strikes the adjustable stop 98 and is then urged outwardly again by centrifugal force. This motion of the centrifugal mass occurs well within 360° rotation which enables the mass to strike the post once for each revolution of the housing. The actual rotational speed of the housing is not critical as long as that speed is constant. Speeds in the range of 2,000 to 4,000 revolutions per minute, preferably 3,000 revolutions per minute may be utilized.

The tape 66 may be a composite of materials such as a layer of wax 110 coated on a paper backer 112. In actual use of the acceleration apparatus, the tape is positioned so that the wax coating 110 slides over the upper surface of the post 54. Carbon paper composites and other markable materials are equally suitable.

As described below, the present invention is utilized for motion study, such as verifying Newton's Second Law, for example. Basically, the primary function of the displacement marker is to provide markings on the tape at regular intervals of time. Needless to say, as the tape accelerates past the displacement marker, the distance between the markings on the tape increase.

In using the acceleration apparatus 10, the motor 52 is energized by depressing starter button 53. This causes the displacement marker to rotate in the direction shown in FIG. 1. When the motor reaches its maximum constant rotary speed, for example 3,000 r.p.m., the post 54 is adjusted until the spherical mass 92 strikes the upper surface thereof once for each revolution of the displacement marker. When these conditions occur, the experiment is run by releasing the flexible tie 74. As explained above, this causes the carriage 30 to move to the right, as viewed in FIG. 1, under the influence of the falling cylinder 72. As the spherical mass 92 strikes the post 54 the wax coated tape 66 is marked once for each revolution of the marker. Since the marker rotates at a constant speed the time increment between adjacent marks on the tape is constant although their spacing increases. The tape may be notched near the clamp 40 on the frame 32 of the carriage 30 so that when the carriage strikes the rubber stop 28 at the end of its travel the tape breaks at the point it is notched. The tape is marked as illustrated in FIG. 5.

When the acceleration apparatus 10 is used to study acceleration as a function of force, the accelerating force of the apparatus is increased without changing the mass of the overall system by transferring mass from the carriage 30 to the hollow cylinder 72. As explained above, the mass of the carriage is equal to five units with three removable units 36 while the mass of the cylinder 72 equals two units. After the first run one of the weights 36 is transferred to the hollow cylinder, and after the second run another weight is transferred to the cylinder. Data for four runs is obtained. Moreover, the apparatus 10 can be utilized to study acceleration as a function of mass by simply removing mass from the carriage and maintaining the pulling force at two units, the mass of cylinder 72. Additionally, the apparatus 10 can be utilized to study the rectilinear motion produced by a variable force. This is accomplished by attaching a rubber band 114 between a pair of hooks 116 and 118 fastened to the carriage 30 and the standard 14, respectively.

FIGS. 6 and 7 illustrate an acceleration apparatus 120 which in many respects is similar to the apparatus shown in FIGS. 1 and 2. The primary difference between these devices resides in the fact that the apparatus shown in FIGS. 6 and 7 may be converted between horizontal and inclined positions, as explained more fully below. Like acceleration apparatus 10, the apparatus 120 includes a carriage and an arrangement for accelerating that carriage along a guide wire. Similar reference characters are utilized to identify similar or substantially similar parts.

When the acceleration apparatus 120 is utilized in its inclined position, as shown in FIG. 6, a pair of struts 122 are utilized to support the apparatus in that position. The struts 122 are hinged to a base member 124 which in turn is hinged at 126 to support 128 for the carriage 30, motor 52 and displacement marker 80. A protractor 130 is provided for determining the angle of inclination. Markable tape 66 is anchored between clamps 132 at the opposite ends of the carriage. The displacement marker is located adjacent the forward clamp in the middle of support 128 so that as the carriage accelerates down the incline along the guide wire 20 displacements of the carriage at regular intervals of time are marked on the tape in the same manner tape 66 is marked in the apparatus of FIGS. 1 and 2.

The apparatus 120 in its inclined position is utilized to measure displacements of the carriage 30 at regular intervals of time and this data is in turn employed to determine the acceleration of the carriage as it coasts down the inclined guide wire 20 under the influence of gravity. In most instances, acceleration of the carriage is measured at several random angles of inclination of the member 128. These accelerations may be graphed as a function of the sine at the angle of inclination with the resulting graphs yielding the experimental value of the gravitational constant $g$ for the particular locality the experiment is conducted.

Apparatus 120 is easily converted to an apparatus similar to acceleration apparatus 10 described above in conjunction with FIGS. 1 and 2. This is accomplished by providing support structure 150 releasably secured to the apparatus 120 adjacent the hinge point 126. The struts 122 can then be adjusted until the member 128 is in a horizontal position. Moreover, when the apparatus 120 is used in its horizontal position, the motor 52 and displacement marker connected to it are moved to the left, as viewed in FIG. 6, to a position close to the left-hand end of the apparatus. A post similar to 54 of apparatus 10, may be provided at that location at all times or simply moved between the two locations of the motor and displacement marker, if only one post is provided. When the apparatus 120 is positioned as shown in FIG. 7, the various components function in the same manner as the components described above with regard to apparatus 10 and the same experimental data is obtained with this apparatus.

Figure 9:
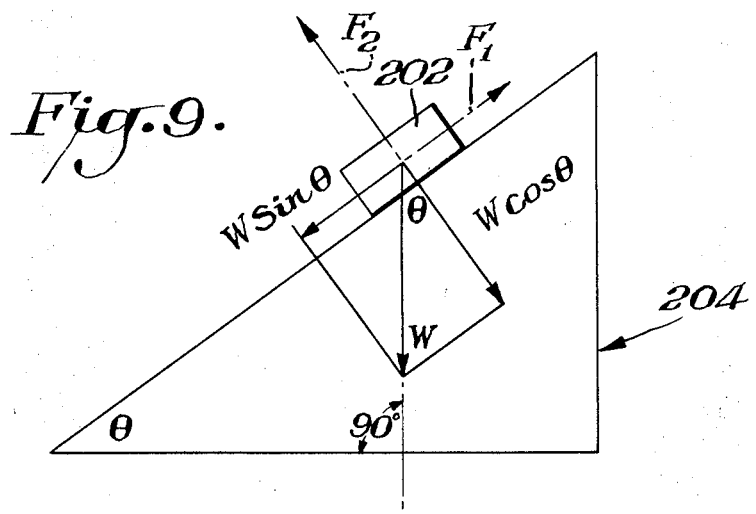
FIG. 9 is a diagram of the forces associated with the apparatus of FIG. 8.

FIGS. 8 and 9 illustrate an inclined plane apparatus 200 according to the present invention. In essence, the apparatus 200 is utilized for determining the weight components of a mass 202 on an inclined plane 204 which components act perpendicular and parallel to the incline of the plane. The inclined plane 204 comprises a base member 206 with a plane member 208 hinged thereto at 210. The upper end of the plane member 208 carries a level 212 for determining the approximate level of the plane and making any necessary adjustments. The angle of inclination of the plane member 208 is set by a pair of struts 214 hinged at their lower ends to the base member 206 and adjustably secured to the plane 208 by fasteners 216, one on each side of the plane member. The inclined plane 204 rests on a support table 218 with the rear side of the base member 206 flush against a guide plate 220 anchored to the support table.

A pair of support rods 222, 224 are secured to the support table 218 on opposite sides of the inclined plane 204. Each rod carries a pulley 226 adjustably secured thereto. The apparatus 220 also includes an adjustable protractor 228 connected to a movable support 230. Another protractor 232 is anchored to the under portion of the plane member 208 for determining the angle of incline of the plane.

The mass 202 has front and rear wheels 234 and 236, respectively, which rest upon a pair of spaced apart electrically conductive strips 238, and is maintained in equilibrium by an electrically conductive stop member 240 fixed to the strips 238, as shown in FIG. 8. The mass 202 including the front and rear wheels is formed of electrically conductive material. Moreover, a series electrical circuit 242 interconnects an indicator lamp 244 and power source 246 with the mass 202, strips 238 and stop 240. As can readily be understood, when the wheels of the mass are in contact with either the strips 238 or the stop 240 the indicator lamp 244 is energized but when the wheels are out of contact with both the strips and stop the circuit is broken and the indicator lamp does not light.

The present inclined plane apparatus 200 operates in the following manner to determine the weight components of a mass on an inclined plane which components act perpendicular and parallel to the incline. First, the inclination of the plane member 208 is set at any arbitrary angle which angle is indicated by the protractor 232. When the plane member 208 is level the fasteners 216 are tightened to securely anchor the struts 214 to the plane member. The mass 202 is then positioned on the inclined plane 204 in static equilibrium with its wheels 234 and 236 resting on the electrically conductive strips 238. Moreover, the front wheels 234 of the mass 202 abut the stop 240.

The next step involves the application of force $F_2$ to the mass 202 in a direction perpendicular to the incline of the plane. This is accomplished by a string 248 or similar flexible member attached to the mass at 249 and extending upwardly and over the pulley 226 on the support rod 222. The proper angle of the string 248 is obtained in the following manner. First, the protractor 228 is adjusted to an angle equal to the angle of inclination of the plane. The support 230 for the protractor is then moved into position so that the edge of the protractor is directly beneath the string 248. While pressing the base member 206 of the inclined plane 204 against the guide plate 220 the inclined plane is moved laterally until the edge of the protractor 228 is parallel to the string 248. When this condition is satisfied, the string is perpendicular to the inclined member 208 of the plane 204. Weights 250 are then applied to the string 248, in a manner described below.

Force $F_1$ is applied to the mass 202 in a direction parallel to the incline of the plane 204. This is accomplished by a string 252 anchored to the mass at 253 and extending upwardly over the pulley 226 on the support rod 224. The string 252 is made parallel to the inclined member 208 by adjusting the pulley 226 on rod 224 until the string is parallel to the inclined member 208. Weights 254 are then attached to the end of the string 252, in a manner described below.

Preferably, forces $F_1$ and $F_2$ are gradually increased by hanging weights, such as 250 and 254, from the strings 228 and 252 until the force $F_2$ is slightly less than that needed to lift the mass 202 free of the inclined plane 204, and the force $F_1$ is just large enough to pull the front wheels 234 of the mass away from the stop 240, as detected by the eye. Under these conditions, the indicator lamp 244 is energized. Force $F_2$ is then gradually increased until the indicator lamp goes out. This indicates that the mass 202 is out of contact with the electrically conductive strips 238 and the stop 240. Next, the force $F_1$ is gradually reduced until the indicator lamp lights, which indicates that the front wheels 234 of the mass have contacted the stop 240 to complete the circuit. The last adjustment of force $F_1$ is followed by an increase in force $F_1$ until the indicator lamp goes out. The weights applied to strings 248 and 252 are then measured and compared with the theoretical values computed by utilizing the actual weight of the mass and the incline of the plane.

Eyelet and lug assemblies of the type described below are utilized to anchor the strings to the mass 202. These assemblies are secured to the mass so that the lines of action of the forces intersect at the center of gravity of the mass 202.

FIGS. 10 and 11 illustrate an experimental derrick apparatus 300 comprising a boom 302 with a hinge pin assembly 304 at the lower end thereof and an L-shaped support 306 for the hinge pin assembly. The L-shaped support is fixed to a support rod 308 at 310 and the rod rests on a support table 312. The boom has a fixed weight 314 suspended from it at 316 as well as a load 318 attached to its upper end 320. The derrick is maintained in static equilibrium by a weight 322 attached to the upper end of the boom by a string 323 trained about a pulley 324 on rod 308. Support structure 325 may be provided to hold the boom in an inclined position until the various weights are adjusted to place the derrick in static equilibrium. Once this is accomplished, the support structure 325 is no longer needed.

The main purpose of the experimental derrick apparatus 300 is to determine the horizontal and vertical components of the reaction force the hinge pin assembly 304 exerts on the boom 302. When the derrick is in static equilibrium, the components of this reaction force are determined in the following manner. A horizontal force $Fx$ is applied to the boom at the hinge pin assembly by weights 326 connected to the hinge pin assembly 304 by a string 328. The string extends from a lug 330 in the center of the boom 302 and runs from that lug to a pulley 332 adjustably attached to a support rod 334. Force $Fy$ is applied to the hinge pin assembly 304 by a weight 336 connected to the hinge pin assembly 304 by a lug 338 in the center of the boom 302. A string 340 is connected to the lug and extends vertically upward to a pulley 342. The free end of the string is attached to the weights 336 and the pulley 342 is attached adjustably to the support rod 308.

A series electrical circuit 350 is provided for interconnecting the hinge pin assembly 304 and the L-shaped support 306 for that assembly. The circuit includes a power source 352 and an indicator lamp 354 for indicating when the circuit is complete.

The forces $Fx$ and $Fy$ are gradually increased by adding weight to the strings 328 and 340. This is continued until the force $Fy$ is slightly less than that needed to lift the hinge pin assembly 304 free of the horizontal side of the L-shaped support 306, and the force $Fx$ is just large enough to pull the hinge pin assembly of the boom free of the vertical side of the L-shaped support 306. When this condition prevails, the series electrical circuit remains complete and the indicator lamp is energized. Force $Fy$ is then gradually increased until the circuit is broken and the lamp goes out. This operation is followed by a gradual reduction in force $Fx$ until the lamp is energized and then an increase in force $Fy$ until the lamp goes out. When this occurs, the horizontal and vertical components, $Fx$ and $Fy$, of the reaction force the hinge pin assembly 304 exerts on the boom 302 are measured. After the theoretical components of the reaction force are determined by analyzing the forces associated with the derrick they are compared with the measured values and found to correspond therewith. An adjustable protractor 356 is provided for measuring the angles needed to compute the theoretical components of the reaction force.

FIGS. 12–14 illustrate an eyelet and lug assembly 400, and more specifically a particular use of this assembly for studying coplanar concurrent forces in equilibrium. The eyelet and lug assembly comprises an eyelet in the form of a shaft 402 with a series of lugs 404, 406, 408 mounted on the shaft 402. Each of the lugs includes a looped portion 410 of the same thickness, and each looped portion loosely surrounds the shaft to facilitate rotation of the lugs about the shaft. Moreover, when the lugs are mounted on the shaft the looped portions contact one another in a line. Each of the lugs also includes a coplanar end portion 412 of the same thickness as a looped portion. In the case of three lugs mounted on the shaft, one of the end lugs has an additional portion 414 connected and equal in thickness to its coplanar end portion 412. The additional portion 414 is offset in the direction of the lug adjacent to it in the line.

When the eyelet and lug assembly is utilized to connect four forces together in coplanar relationship a fourth lug 416 is provided. Lug 416 includes a looped portion 410 as well as a coplanar end portion 412. Additionally, end lug 416 has an additional portion 414 connected and equal in thickness to its coplanar end portion 412. Like end lug 404, the additional portion 414 on lug 416 is offset in the direction of the lug adjacent to it in the line.

Although the eyelet and lug assembly 400 has utility in other arrangements, such as those described above, it is particularly useful in an apparatus for studying coplanar concurrent forces in equilibrium. FIG. 12 illustrates an apparatus for conducting such a study. In this regard, a support table 420 is provided with a pair of spaced apart supporting rods 422, 424, and each of the rods supports a pulley or bearing 425 at its upper end. In the arrangement illustrated in FIG. 12, three lugs are used to conduct the study. A string 426 is connected to the middle lug 406 and a weight 428 attached to the free end of the string. Additionally, strings 430 and 432 are connected to end lugs 408 and 404, respectively. These strings are trained over the pulleys 425 and weights 434 and 436 connected to their free ends, as illustrated in FIG. 12. An adjustable protractor 438 is provided for measuring the angles of the strings 430 and 432. The study is conducted by resolving the various forces acting on the shaft 402 into their horizontal and vertical components. The horizontal forces acting in one direction approximately cancel those horizontal forces acting in the opposite direction and the same is true of the vertical forces, which proves that the forces are in static equilibrium.

As mentioned above, the forces are in coplanar relationship with each other. This is accomplished by connecting the strings to the lugs as shown in FIGS. 13 and 14. In this regard, each of the strings passes through an opening in its respective lug. Referring to FIG. 14, string 432 passes through the coplanar end portion 412 and the additional portion 414 and is knotted at 440. Thus, string 432 is spaced two equal distances from a given side of the eyelet and lug assembly. By passing string 426 through the opening in lug 406 in the same direction as string 432 it is positioned in the same plane as string 432. Finally, by passing string 430 through the opening in its lug 408 in the opposite direction it is positioned in the same plane as the other two strings. As can readily be understood, use of the eyelet and lug arrangement enables a variety of forces to be applied to the eyelet, which forces are in coplanar relationship to one another. Moreover, if five lugs are assembled on the eyelet the fifth lug can include an additional portion twice the thickness of its coplanar end portion. The eyelet and lug assembly eliminates torque in the system it is used.

What is claimed is:
1. A marker for recording the displacement of a moving object at regular intervals of time comprising a housing having a longitudinal axis about which the housing rotates when the marker is connected to a source of constant rotary power, a passageway in the housing extending inwardly from an open end at the exterior of the housing toward the longitudinal axis of the housing, a movable mass within the passageway, and stop means for limiting movement of the mass between a marking position in which the mass extends beyond the exterior surface of the housing and non-marking positions in which the mass is spaced inwardly from its marking position.

2. A displacement marker as in claim 1 wherein the movable mass is spherical.

3. A displacement marker as in claim 1 wherein the passageway is radially disposed relative to the longitudinal axis of the housing.

4. A displacement marker as in claim 1 wherein the stop means includes a fixed stop at the exterior of the housing and an adjustable stop spaced inwardly from the fixed stop.

5. A displacement marker as in claim 4 wherein the movable mass is spherical and the fixed stop has a circular opening of smaller diameter than the diameter of the spherical mass.

6. A displacement marker as in claim 1 in combination with a source of constant rotary power connected to rotate the housing about its longitudinal axis, a post slightly spaced from the exterior of the housing and positioned so that the movable mass strikes the post once for each revolution of the housing, a tape, and moving means for drawing the tape between the housing and the post whereby the tape is marked upon each impact of the movable mass against the post and the markings on the tape record the displacement of the moving means at regular intervals of time.

References Cited

UNITED STATES PATENTS

| | | |
|---|---|---|
| 2,997,358 | 8/1961 | Lefebvre. |
| 3,149,901 | 9/1964 | Hagelbarger. |
| 3,351,949 | 11/1967 | Brown _____ 346—141 X |

EUGENE R. CAPOZIO, Primary Examiner

H. S. SKOGQUIST, Assistant Examiner

U.S. Cl. X.R.

346—141; 197—1